United States Patent [19]
Aponte

[11] Patent Number: 5,314,339
[45] Date of Patent: May 24, 1994

[54] EDUCATIONAL MEDICAL MANNEQUIN

[76] Inventor: Marivel Aponte, 1104 McKinnon Ave., Oviedo, Fla. 32765

[21] Appl. No.: 38,654

[22] Filed: Mar. 29, 1993

[51] Int. Cl.⁵ .............................................. G09B 23/28
[52] U.S. Cl. ...................................... 434/267; 434/262
[58] Field of Search .................. 446/295, 296, 472; 434/262, 265, 267, 266, 272, 273

[56] References Cited

U.S. PATENT DOCUMENTS

| | | | |
|---|---|---|---|
| D. 310,856 | 9/1990 | Penderson | 434/273 X |
| 2,774,184 | 7/1953 | Hefferan et al. | 434/267 X |
| 2,781,611 | 11/1953 | Bills et al. | 434/267 X |
| 2,959,891 | 4/1959 | Barnett et al. | 434/267 X |
| 3,224,139 | 12/1965 | Reuge | 446/295 |
| 3,722,108 | 3/1973 | Chase | 434/267 |
| 3,858,351 | 1/1975 | Porter | 434/267 X |
| 4,182,054 | 1/1980 | Wise et al. | 434/272 X |
| 4,257,188 | 3/1981 | Barker | 446/295 |
| 4,288,222 | 9/1981 | Kling | 434/272 |
| 4,411,629 | 10/1983 | Voights | 434/266 |
| 4,439,162 | 3/1984 | Blaine | 434/273 X |
| 4,605,380 | 8/1986 | Camm et al. | 446/14 |
| 4,710,145 | 12/1987 | Hall Vandis | 434/267 X |
| 4,717,363 | 1/1988 | Refabert | 434/267 X |
| 4,773,865 | 9/1988 | Baldwin | 434/268 |
| 4,917,607 | 4/1990 | Van Hoose | 446/295 X |
| 4,984,987 | 1/1991 | Brault et al. | 434/265 |
| 5,061,188 | 10/1991 | McCollum | 434/267 |
| 5,094,644 | 3/1992 | Kelley | 434/296 |
| 5,096,424 | 3/1992 | Carlberg | 434/262 |

Primary Examiner—Gene Mancene
Assistant Examiner—Cindy A. Cherichetti
Attorney, Agent, or Firm—Paul S. Rooy

[57] ABSTRACT

An educational medical mannequin comprising head, neck, torso, arms and legs. Alternate embodiments of the educational medical mannequin may comprise, in any combination, a tracheostomy opening, injection zones disposed at various locations, nitro patches, a J feeding tube, a stoma, a supra pubic catheter opening, a wound, a decubitus site, a vein with phlebitis, an edematous hand, a breathing sound generator, and kidney location indicia. Additional equipment that may be used in combination with the educational medical mannequin include an intravenous assembly, a catheter and a hypodermic syringe. The educational medical mannequin is used for training nurses and lay persons in various medical procedures.

24 Claims, 4 Drawing Sheets

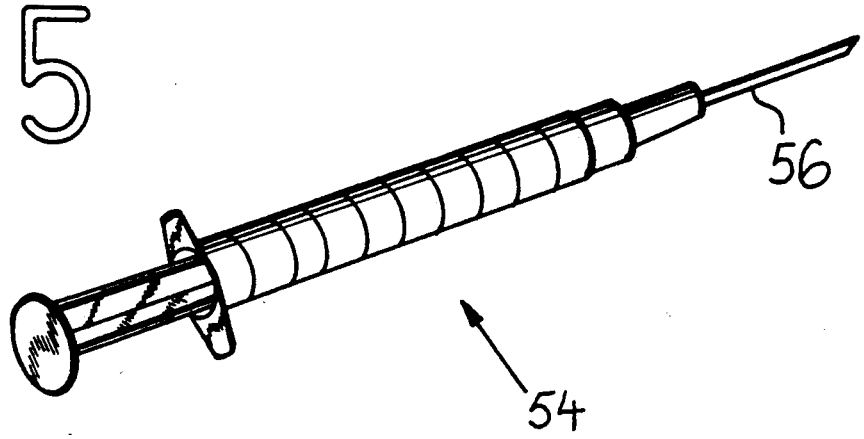
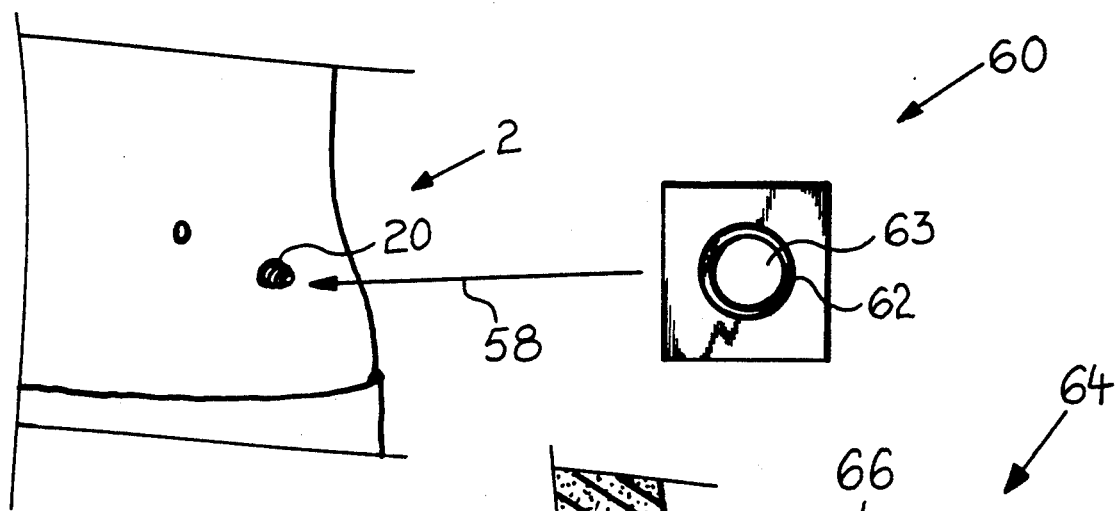
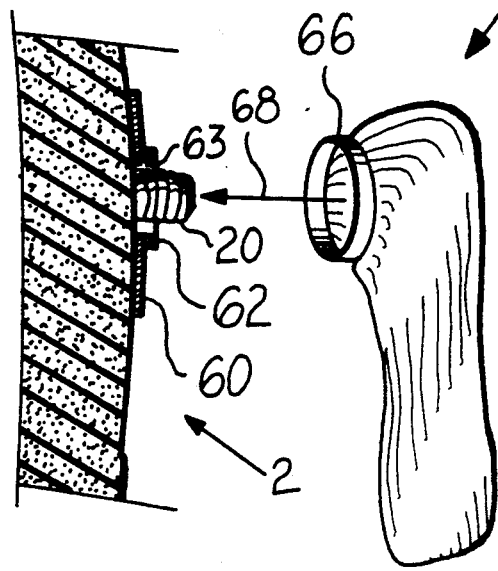

EDUCATIONAL MEDICAL MANNEQUIN

BACKGROUND OF THE INVENTION

1. Field of the Invention

The instant invention relates to training devices, and in particular to an educational medical mannequin.

2. Background of the Invention

The present invention is intended to aid in the training of two groups of individuals: those being cared for in a home care environment and their caregivers, and professional individuals such as nurses.

Home Care

At the present time in the United States, rapidly increasing medical care costs are creating grave problems. The use of limited national financial resources to pay for medical care renders those funds unavailable for investment and other urgently needed national spending priorities, and increases the size of the deficit (a serious problem in its own right).

One approach toward fighting this medical cost problem, which is gaining increasing support within the medical community, is the emphasis of home care solutions to medical conditions (as opposed to more costly hospital care). The thinking here is that the patient may be educated in self care, at the home. The home care program would be supervised by a visiting professional such a nurse, who would make periodic visits to monitor the patient's condition and provide reinforcing training and medical services beyond the patient's competency. It is anticipated that the cost savings would be significant on a national scale if a greater percentage of medical care could be self-administered home care, as opposed to in-hospital treatment.

A well-trained patient may be capable of performing a wide variety of home care tasks. Areas where a patient might participate in his own care include: intravenous equipment maintenance, urinary equipment maintenance (including supra-pubic catheter, Foley catheter and ileo conduit), renal procedures, endocrine procedures (including diabetic care), wound care (including decubitus care), respiratory procedures, gastro-intestinal procedures and hygene.

Many of these procedures are relatively simple, and the best all-around solution would be for the patient to perform them. A major barrier in accomplishing this, however, is the lack of training equipment, specifically the lack of a mannequin equipped so as to allow the demonstration and practice of these procedures.

Professional Training

It is of vital importance to effectively train medical professionals in the above mentioned procedures. One reason is so the professional will be able to perform these procedures competently and safely. A second reason is so the professional can then instruct home care providers and the patients themselves in the proper performance of the various procedures.

Achieving the training of medical professionals in these procedures is more difficult than it needs to be due to the lack of effective training devices. Specifically, the quality and speed of training could be increased through the use of an educational medical mannequin.

SUMMARY OF THE INVENTION

Accordingly, it is an object of this invention to provide an educational medical mannequin which may be used in training health care providers in intravenous procedures, urinary procedures (including supra-pubic catheter, Foley catheter and ileo conduit), renal procedures, endocrine procedures (including diabetic care), wound care (including decubitus care), respiratory procedures, gastro-intestinal procedures and hygene.

Design features allowing this object to be accomplished include a medical mannequin comprising a vein with flebitis, colostomy site with stoma, nitrogen patches, feeding tube, endematous hand, supra-pubic catheter opening, urethral catheter, injection zones, duoderm dressing site, wound showing various tissue conditions, and an audio playback device to demonstrate various breathing sounds including Kussmaul breathing sounds.

Benefits associated with the achievement of this object include improved ability to train individuals involved in home care, with attendant cost savings, and improved quality and speed in training medical professionals.

Another object of the instant invention is to provide an educational medical mannequin which is constructed of readily available materials, an is thus readily affordable.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIG. 2. Sheet three contains FIGS. 3 and 4. Sheet four contains FIGS. 5, 6 and 7.

FIG. 5 is a front isometric view of a hypodermic syringe.

FIG. 6 is a front isometric view of an adhesive wafer about to be installed on an educational medical mannequin.

FIG. 7 is a side view of a pouch about to be installed on an educational medical mannequin.

DETAILED DESCRIPTION OF THE PREFERRED EMBODIMENT

Figure 1:
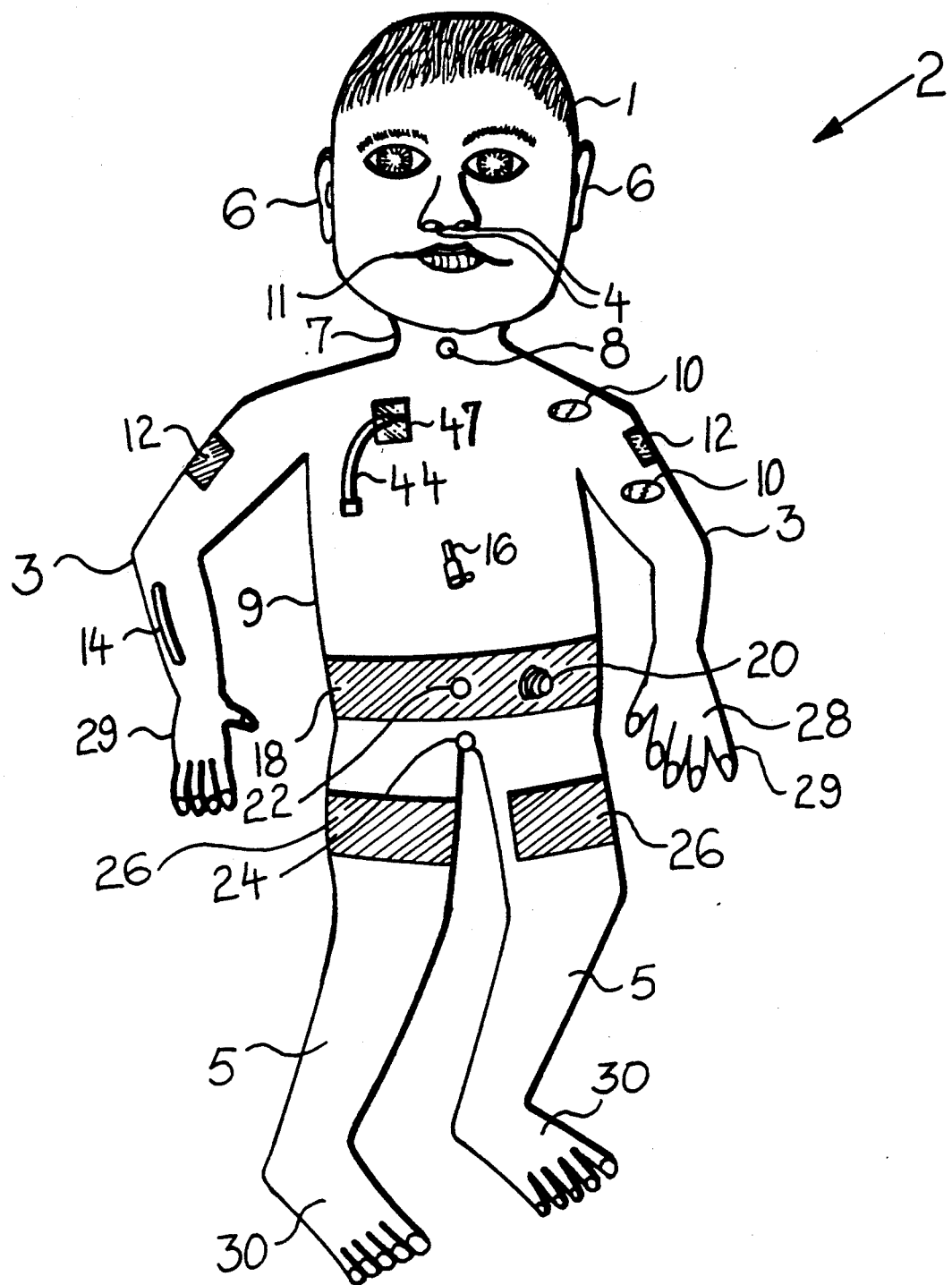
FIG. 1 is a front isometric view of the educational medical mannequin.

FIG. 1 is a front isometric view of educational medical mannequin 2. Educational medical mannequin 2 is a facsimile of a human being, comprising head 1 with ears 6, mouth 11, and nostrils 4 attached to torso 9 by means of neck 7, and arms 3 and legs 5 further attached to torso 9. Arms 3 terminate in hands 29. Legs 5 terminate in feet 30.

Feet 30 may be used to teach patients and caregivers to observe for cuts, redness, bruising, calluses, proper washing, etc. Nostrils 4 may be used to teach proper nasal cannula emplacement and maintenance. Mouth 11 may be used in the instruction of swabbing the mouth and tooth brushing.

Neck 7 comprises tracheostomy opening 8, which may be used to teach proper tracheostomy opening care. In conjunction with a appropriately sized tracheostomy kit, proper tracheostomy procedures may be taught.

Figure 2:
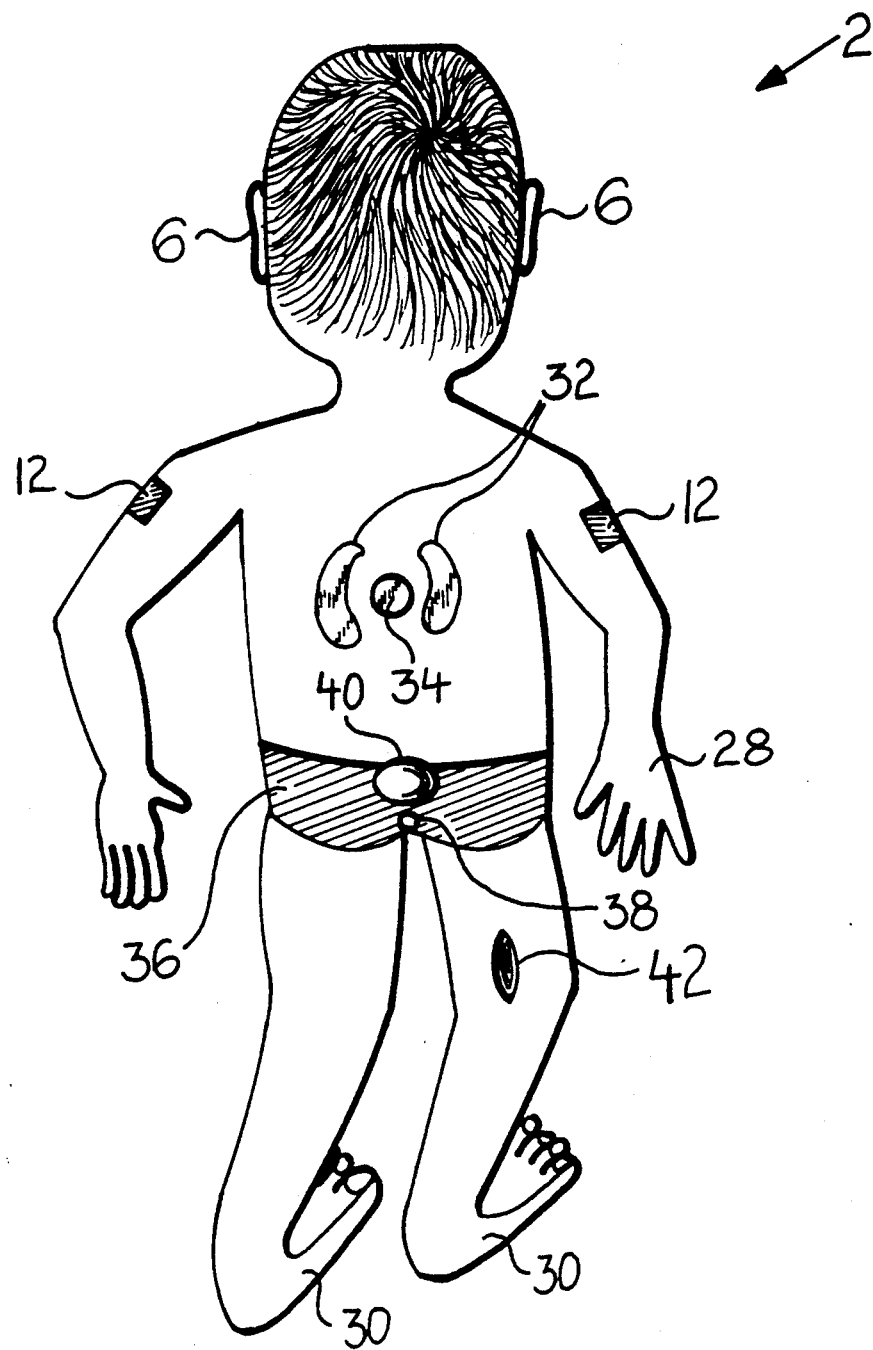
FIG. 2 is a rear isometric vies of the educational medical mannequin.
Figure 3:
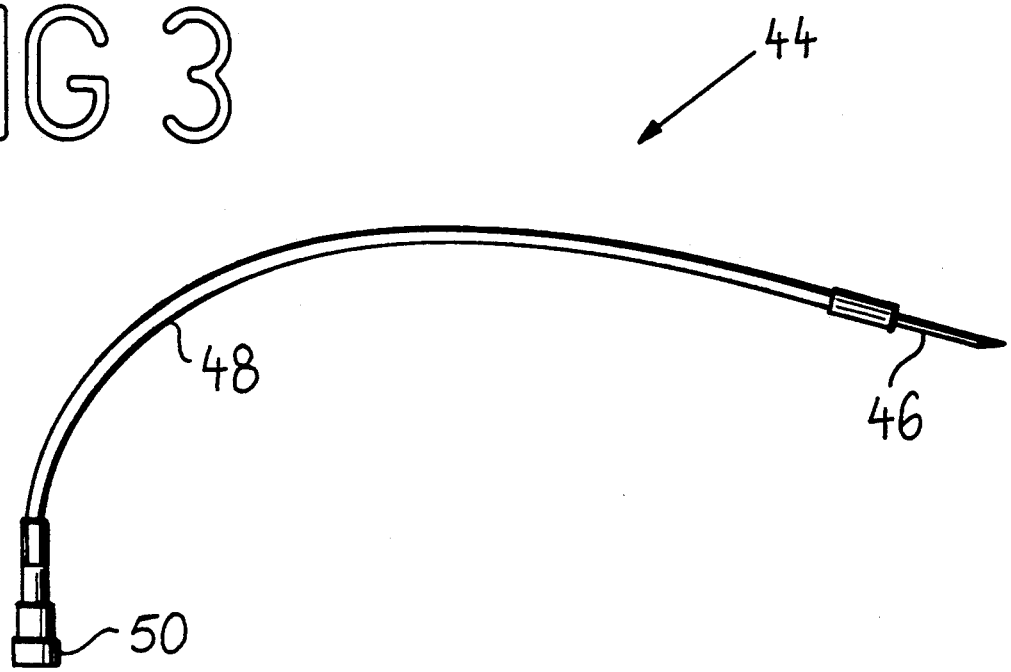
FIG. 3 is a front isometric view of an intravenous assembly.

Adhesive nitro patches 10 are provided to teach cardiac patients the correct installation and procedures of nitro patches 10. Arm injection zones 12, waist injection zone 18, leg injection zones 26 and buttocks injection zone 36 (see also FIG. 2) are used as training aids to demonstrate the correct areas to give shots, or to emplace an intravenous assembly 44 (see FIG. 3).

Shot training may be administered using educational medical mannequin 2 in combination with an appropriately sized hypodermic syringe 54 as illustrated in FIG. 5. Hypodermic needle 56 is stuck into educational medical mannequin 2 in one of the injection zones 12, 18, 26 or 36.

Intravenous procedures may be instructed by using educational medical mannequin 2 in combination with intravenous assembly 44. Intravenous assembly 44 is comprised of tube 48, intravenous needle 46 attached to one end of tube 48, and cap 50 removably attached to the other end of tube 48. Intravenous needle 46 is stuck into educational medical mannequin 2 and taped in place using medical tape 47.

Signs and symptoms of phlebitis may be taught using vein with phlebitis 14, which appears irritated with a red streak. Signs and symptoms of infiltration (swelling causing intravenous fluid to flow into the tissue rather than the blood stream) may be demonstrated. The student may be taught how to discontinue the intravenous procedure if a problem arises, how to change the intravenous tube 48 and how to flush the intravenous assembly 44.

Intravenous assembly 44 may also be used to teach blood transfusion techniques to nurses, and how to check the intravenous medication for name, expiration date, and color. J feeding tube 16 is used in training students to care for patients on a feeding tube, normal procedures and recognizing the signs and symptoms of problems. J feeding tube 16 is colored different colors so the student may learn to recognize the significance of different colors in the tube: possible infection starting—yellow; presence of blood—red; infection, take a culture—green.

Figure 4:
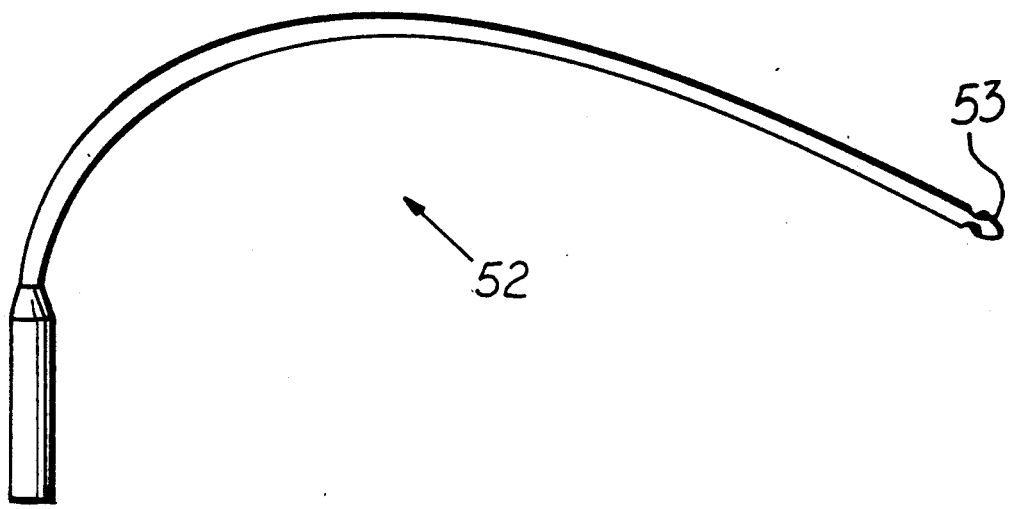
FIG. 4 is a front isometric view of a catheter.

Supra pubic catheter opening 22 and urethra 24 are used to demonstrate the proper installation of catheter 52 (see FIG. 4) by inserting catheter tip 53 into supra pubic catheter opening 22 or urethra 24 to the appropriate depth. Signs and symptoms of problems associated with the use of catheters may also be instructed.

Stoma 20 may be used in combination with adhesive wafer 60 and pouch 64 (see FIGS. 6 and 7) to instruct colostomy, ileostomy and urostomy patient care. FIGS. 6 and 7 illustrate one method of installing pouch 64. Adhesive wafer 60 having wafer aperture 63 is installed around stoma 20 as indicated by arrow 58. Then pouch 64 is installed on adhesive wafer 60 as indicated by arrow 68 by pressing pouch flange 66 firmly onto wafer flange 62 in one continuous motion from bottom to top. Pouch flange 66 will be felt to snap into position over wafer flange 62; a gentle tug downwards on pouch 64 will confirm that pouch flange 66 is firmly attached to wafer flange 62.

Educational medical mannequin 2 comprising stoma 20 in combination with adhesive wafer 60 and pouch 64 may be used to teach stoma care, skin care, changing pouches, proper wafer attachment and irrigation. Signs and symptoms of problems such as necrotic stoma, infected stoma and prolapse stoma may be taught. The student may be taught to observe changes in stoma size and color, measuring the stoma, and changes in stool color and consistency. The student may also be taught tips on deodorizing, foods that form gas or are constipating, and cleaning procedures.

One hand 29 is swollen so as to present the aspect of an endematous hand 28. Endematous hand 28 is used to teach the student recognition of this condition.

Kidney locations 32 may be used to teach the correct kidney location. Breathing sound generator 34 may be used to teach the student how to recognize different breathing sounds and their significance, for example Kussmaul Respirations fast deep breathing signifying the patient is in a ketoacidosis coma). Breathing sound generator 34 may be a solid state playback-only device powered by at least one battery.

Decubitus site 40 is used to teach recording of observations of decubitus (bedsores) to reveal healing progress or deterioration, and how to differentiate between healthy and necrotic tissue. Educational medical mannequin 2 may be used to teach proper patient positioning, nutrition and skin care to prevent decubitus from forming. The care of decubitus may also be taught, using various methods such as wet to dry dressings, douderm, duoderm granules, wound description, infection control, massaging bony prominences and use of enzymes and topical agents.

Anus 38 may be used in combination with an appropriately sized enema apparatus to teach the proper administration of enemas.

Wound 42 is colored to teach recognition of different tissue conditions in the wound (normal, healthy—red; incipient infection—yellow; necrotic or gangrenous—black). The student may be taught wound packing, wound irrigation, applying slings and Ace wraps, wound measurement and the signs and symptoms to report to the doctor in charge. Diabetic patients have poor circulation and undergo many amputations due to poor wound healing which is not taken care of in time. Wound monitoring and care specific to the diabetic patient may be taught.

Educational medical mannequin 2 may be constructed of cloth, synthetic material or other appropriate material. Hypodermic syringe 54, intravenous assembly 44, nitro patches 10, adhesive wafer 60 and pouch 64 may be fabricated of plastic, metal, sunthetic or other appropriate material. Pouch 64 and nitro patches may be attached to educational medical mannequin 2 by means of removable adhesive, hook and loop material, or other suitable means.

While a preferred embodiment of the invention has been illustrated herein, it is to be understood that changes and variations may be made by those skilled in the art without departing from the spirit and scope of the appending claims.

DRAWING ITEM INDEX 1 head
2 educational medical mannequin
3 arm
4 nostrils
5 leg
6 ear
7 neck
8 tracheostomy opening
9 torso
10 nitro patches
11 mouth 12 arm injection zone
14 vein with phlebitis
16 J feeding tube
18 waist injection zone
20 stoma
22 supra pubic catheter opening
24 urethra
26 leg injection zone
28 edematous hand
29 hand
30 foot
32 kidney location
34 breathing sound generator
36 buttocks injection zone
38 anus
40 decubitus site
42 wound
44 intravenous assembly
46 intravenous needle
47 medical tape
48 tube
50 cap
52 catheter
53 catheter tip
54 hypodermic syringe
56 hypodermic needle
58 arrow
60 adhesive wafer
62 wafer flange
63 wafer aperture
64 pouch
66 pouch flange
68 arrow

I claim:

1. An educational medical mannequin comprising:
   a head comprising ears, nostrils and a mouth, said head being attached to a torso by means of a neck;
   arms terminating in hands attached to said torso;
   legs terminating in feet attached to said torso;
   a wound disposed on said educational medical mannequin; and
   a decubitus site.

2. The educational medical mannequin of claim 1 wherein a portion said wound is colored red to depict normal tissue, a portion of said wound is colored yellow to depict tissue with incipient infection and a portion of said wound is colored black to depict necrotic, gangrenous tissue.

3. The educational medical mannequin of claim 1 wherein said neck further comprises a tracheostomy opening.

4. The educational medical mannequin of claim 1 further comprising an intravenous assembly attached to said educational medical mannequin.

5. The educational medical mannequin of claim 4 wherein said intravenous assembly is comprised of a tube, an intravenous needle attached to one end of said tube and a cap removably attached to the other end of said tube, said intravenous needle being stuck into said educational medical mannequin and taped in place.

6. The educational medical mannequin of claim 1 further comprising at least one nitro patch removably attached to said educational medical mannequin.

7. The educational medical mannequin of claim 1 further comprising a J feeding tube attached to said educational medical mannequin.

8. The educational medical mannequin of claim 7 wherein said J feeding tube may be colored, in any combination, yellow whereby a possible infection may be depicted, red whereby the presence of blood may be indicated, and green whereby an active infection may be depicted.

9. The educational medical mannequin of claim 1 further comprising a red, swollen vein whereby the presence of phlebitis may be illustrated.

10. The educational medical mannequin of claim 1 further comprising at least one arm injection zone marked on at least one said arm.

11. The educational medical mannequin of claim 10 further comprising a hypodermic syringe having a hypodermic needle.

12. The educational medical mannequin of claim 1 further comprising a waist injection zone marked on said educational medical mannequin.

13. The educational medical mannequin of claim 1 further comprising a buttocks injection zone marked on said educational medical mannequin.

14. The educational medical mannequin of claim 1 further comprising at least one leg injection zone marked on at least one said leg.

15. The educational medical mannequin of claim 1 further comprising kidney locations marked on said torso, whereby kidney location may be indicated.

16. The educational medical mannequin of claim 1 further comprising a breathing sound generator.

17. The educational medical mannequin of claim 16 wherein said breathing sound generator is a solid state, playback-only device powered by at least one battery.

18. The educational medical mannequin of claim 1 further comprising an anus.

19. The educational medical mannequin of claim 1 wherein one said hands is swollen, thereby depicting an edematous hand.

20. An educational medical mannequin comprising:
    a head comprising ears, nostrils and a mouth, said head being attached to a torso by means of a neck;
    arms terminating in hands attached to said torso;
    legs terminating in feet attached to said torso;
    a wound disposed on said educational medical mannequin; and
    a supra pubic catheter opening.

21. The educational medical mannequin of claim 20 further comprising an urethra.

22. The educational medical mannequin of claim 20 further comprising a catheter having a catheter tip, said catheter tip being sized to frictionally fit into said supra pubic catheter opening or said urethra.

23. An educational medical mannequin comprising:
    a head comprising ears, nostrils and a mouth, said head being attached to a torso by means of a neck;
    arms terminating in hands attached to said torso;
    legs terminating in feet attached to said torso;
    a wound disposed on said educational medical mannequin; and
    a stoma attached to said educational medical mannequin.

24. The educational medical mannequin of claim 23 in combination with:
    an adhesive wafer comprising a wafer flange and a wafer aperture, said wafer aperture being sized to admit passage to said stoma; and
    a pouch, said pouch comprising a pouch flange sized to frictionally fit over said wafer flange.

* * * * *